United States Patent

Lammerting et al.

[11] Patent Number: 4,728,690
[45] Date of Patent: Mar. 1, 1988

[54] PROCESS FOR PRODUCING MOLDED POLYURETHANE PARTS

[75] Inventors: Helmut Lammerting, Herbede; Hans-Joachim Kollmeier, Essen, both of Fed. Rep. of Germany

[73] Assignee: Th. Goldschmidt AG

[21] Appl. No.: 840,911

[22] Filed: Mar. 18, 1986

[30] Foreign Application Priority Data

Mar. 19, 1985 [DE] Fed. Rep. of Germany ....... 3509810

[51] Int. Cl.$^4$ .............................................. C08G 18/30
[52] U.S. Cl. .................................. 524/714; 264/328.1; 264/328.6; 264/328.8; 524/719; 524/720; 524/722; 524/731; 524/773; 524/778; 528/27; 528/28; 528/48; 528/53; 528/57
[58] Field of Search ............... 524/714, 719, 720, 722, 524/731, 773, 778; 528/48, 53, 27, 28, 57; 264/328.1, 328.6, 328.8

Primary Examiner—Maurice J. Welsh
Assistant Examiner—S. A. Acquah
Attorney, Agent, or Firm—Toren, McGeady & Associates

[57] ABSTRACT

Process for producing molded polyurethane parts using as internal release agents, compounds of the general formula

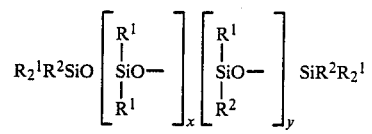

in amounts of 0.5 to 10 weight percent, based on the reaction formulation, in which at least one $R^2$ radical in the average molecule represents

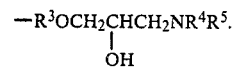

$R^3$ is a divalent hydrocarbon radical with 2 to 4 carbon atoms and $R^4$, $R^5$ are univalent hydrocarbon radicals or together are part of a morpholine or a piperazine ring. The molded polyurethane parts can be removed from the mold using significantly lower tensional forces without residues being built up on the mold.

13 Claims, No Drawings

PROCESS FOR PRODUCING MOLDED POLYURETHANE PARTS

BACKGROUND OF THE INVENTION

1. Field of the Invention

The invention relates to a process for producing molded polyurethane parts or elements by reacting at least one polyol with an organic di- or polyisocyanate in the presence of catalysts and release agents while molding the product. More particularly, the invention relates to a process for producing molded polyurethane parts by the reaction-injection molding (RIM) process.

2. Description of the Prior Art

Molded polyurethane parts are used to a large extent in the automobile industry as car body parts, such as, guard plates, spoilers or fenders. Because of their toughness and abrasion resistance, they are suitable as shoe soles, heels and for many other purposes requiring such properties.

Curing of the polyurethanes takes place simultaneously with the molding process in closed, heated molds. For this purpose, the reaction-injection-molding process or so-called RIM process, has gained particular importance.

In such a process, considerable problem arises because the molded polyurethane parts tend to adhere to the internal walls of the mold. A large number of release agents are known to those skilled in the production of molded parts from reactive composition. Such release agents may be applied on the internal walls of the molds or added as internal release agents to the reaction formulation. These internal release agents belong to several different classes of compounds. As internal release agents, metal soaps, such as, for example, zinc stearate, esters of higher fatty acids, natural or synthetic oils, waxes or silicones are used.

Particularly preferred are those products which do not require any special preparation of the molds, which do not affect the properties of the fully reacted, molded plastic material, and which not or at most minimally affect the surface properties of the molded articles, e.g., impair the paintability. The internal release agents should be evenly distributed in the reaction formulation. However, in order to function as release agents, they must accumulate at the surface of the molded part.

Examples of internal release agents used in the production of molded polyurethane parts by the RIM process, are organosilicon block copolymers which, aside from siloxane blocks, have polyoxyalkylene blocks. In this connection, the structure of the compounds evidently plays a significant role in the release behavior.

For example, German Offenlegungsschrift No. 25 43 638 discloses that compounds of the formula

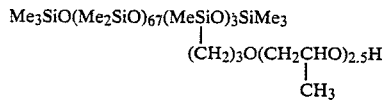

are inferior to compounds having the formula

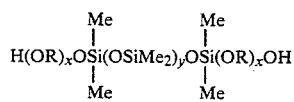

and/or

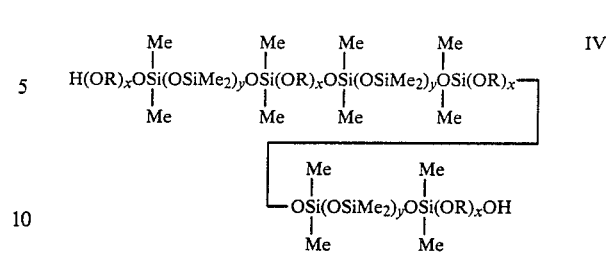

wherein in Formulas II to IV, the subscript x in each case has an average value of 3 to 45, the subscript y in each case has an average value of 8 to 198, Me represents methyl and the $(-OR)_x$ radical represents a polyoxyalkylene polymer or a polyoxyalkylene copolymer, R being composed of ethylene radicals or butylene radicals or mixtures of ethylene or butylene radicals with propylene radicals and the amounts of ethylene or butylene radicals in relation to the amount of the propylene radicals being selected so that the ratio of the carbon atoms to the oxygen atoms in the whole block $(-OR)-$ is 2.0:1 to 2.9:1.

This Offenlegungsschrift also provides test methods for determining and comparing the release properties of various release agents.

More recent work shows that certain functional groups can improve the release properties. Siloxanes with such functional groups are known from U.S. Pat. No. 4,076,695. As functional groups, they contain carboxyl groups which are linked hydrocarbons, which, in turn, are linked to the siloxane frame by means of an Si—C or an SiOC bond. However, these release agents with carboxyl groups do not form stable mixtures with the polyols, which contain amine and, optionally, tin catalysts. Moreover, the gel time of the polyurethane system is lengthened by the addition of these compounds.

Because of their reactivity, these compounds cannot be used as a component of the isocyanate component.

These disadvantages are largely overcome by using as release agents the organosilicon compounds described in U.S. Pat. No. 4,472,341. These siloxanes have

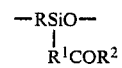

units, in which R is a lower alkyl or aryl group. $R^1$ is a divalent hydrocarbon radical, which may contain oxygen or sulfur atoms. $R^2$ is a low molecular weight alkoxy or aroxy group or the $R^3O(CHR^4CH_2O-)_x$ group, $R^3$ being a hydrogen or methyl radical and x having a value of 1 to 50. However, their release behavior does not satisfy completely. The same is true for siloxanes with organically bound $CONR_2$ groups, in which R represents hydrogen radicals.

SUMMARY OF THE INVENTION

We have discovered internal release agents for the production of molded urethane parts, especially by the RIM process, which optimally fulfill the requirements outlined above.

More particularly, this is achieved by using as an internal release agent in amounts from 0.5 to 20 weight percent, based on the weight of the total reaction formulation, compounds having the general average formula

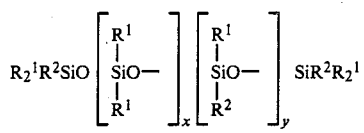

in which
R¹ may be the same or different and represents an alkyl radical with 1 to 18 carbon atoms or an aryl radical, with at least 70% of the R¹ radicals being methyl radicals,
R² is the same as R¹ or represents one of the following radicals,

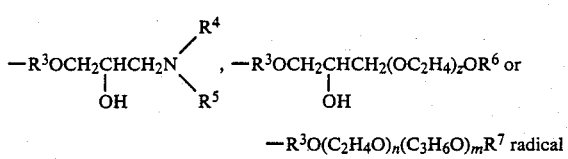

in which
R³ is a divalent hydrocarbon radical with 2 to 4 carbon atoms,
R⁴, R⁵ are univalent hydrocarbon radials or together are part of a morpholine or a piperazine ring,
R⁶ is a low molecular weight alkyl radical with 1 to 4 carbon atoms,
R⁷ is a hydrogen, acyl or R⁶ radical,
z=1 to 10
n=1 to 20 and
m=1 to 20,
with the proviso that, in the average molecule, at least one R² radical represents the

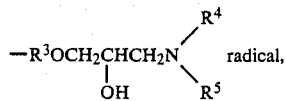

x=20 to 300 and
y=1 to 20.

DESCRIPTION OF THE PREFERRED EMBODIMENT

The R¹ radical is linked to silicon and is preferably a low molecular weight alkyl radical with 1 to 4 carbon atoms, the methyl radical being especially preferred. The R¹ radical may represent different entities in the average molecule; however, the condition must be fulfilled that at least 70% of the R¹ radicals are methyl radicals. The remaining 30% of the R¹ radicals may be ethyl, propyl, or butyl radicals. However, alkyl radicals with up to 18 carbon atoms may also be linked to silicon. As a rule, the latter are contained in only a small proportion of up to 10% of the R¹ radicals.

In the average molecule, at least one R² radical must represent the

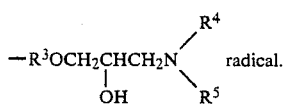

The bridging, divalent hydrocarbon radical preferably is the —CH₂CH₂CH₂— radical. The R⁴, R⁵ radicals, linked to nitrogen, preferably are alkyl radicals with 1 to 10 carbon atoms, such as, methyl, ethyl, propyl, isobutyl, cyclohexyl or decyl radicals. The R⁴, R⁵ radicals may also be alkyloxyalkyl radicals, for example, —CH₂CH₂OCH₃ radicals. The two radicals may be replaced by a cyclic radical. In this case, the R⁴, R⁵ radical together are part of a morpholine or piperazine ring, for example:

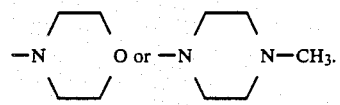

Preferably, the R² radicals represent the following entities:

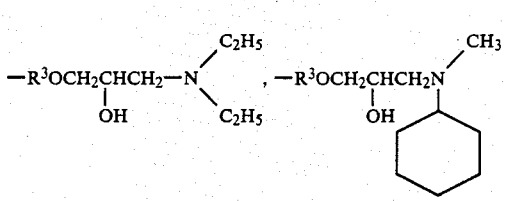

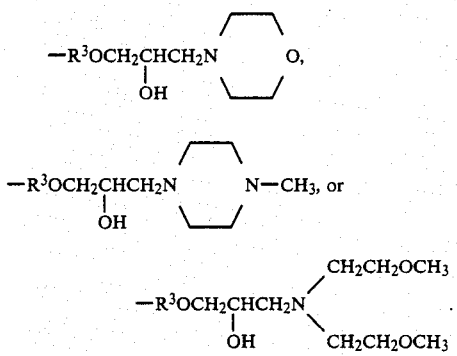

If the condition is fulfilled that at least one of the R² radicals represents the

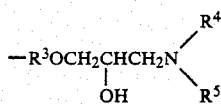

radical, the R² radical may also represent the

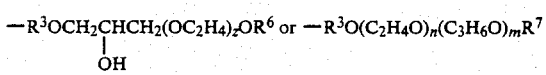

radical. In this case, R⁶ is a low molecular weight alkyl radical, preferably the methyl radical. R⁷ is a hydrogen or an acyl radical or the R⁶ radical, the methyl, ethyl, propyl or butyl radical being preferred. The value of z is 1 to 10 and n and m, in each case, are 1 to 20. These R⁴ radicals contribute to the compatibility of the organosilicon compounds with the polyol that is part of the reaction mixture.

The subscripts x and y characterize the number of difunctional silicon units. Preferably, x is 60 to 200 and y is 3 to 10.

Aside from these special organosilicon compounds, known release agents or additives may also be used in the inventive process. In particular, these are metal salts of fatty acids with more than 8 carbon atoms.

Preferably, the calcium salts of stearic and palmitic acids or esters of fatty acids and trihydric or multihydric alcohols, such as, for example, glycerine tristearate, pentaerythritol tetraoleate or sorbitan laurate may be used. These auxiliary release agents are advisably added in amounts of 1 to 5 weight percent, based on the total weight of the reaction formulation.

The synthesis of the compounds used in accordance with the invention is accomplished in a known manner by the addition of compounds which have an olefinically unsaturated group instead of the $R^3$ group, to siloxanes with SiH groups, corresponding, for example, according to the reaction:

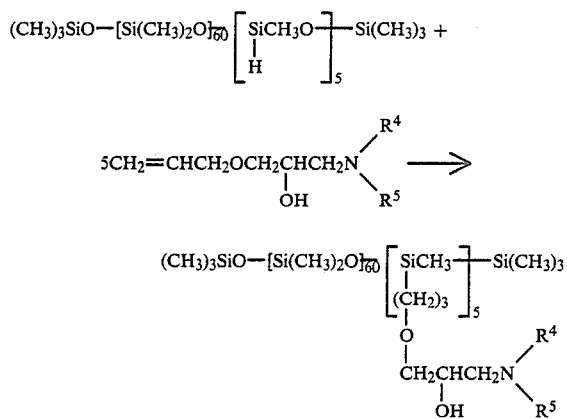

In a similar manner, the compounds $$CH_2=CHCH_2OCH_2\underset{|}{C}HCH_2(OC_2H_4)_zOR^6 \text{ and}$$
$$\phantom{CH_2=CHCH_2OCH_2C}OH$$

$$CH_2=CHCH_2O(C_2H_4O)_n(C_3H_6O)_mR^7$$

are reacted in order to introduce the additional $R^2$ radicals named. The reaction is catalyzed by the addition of platinum compounds.

A preferred procedure for carrying out the reaction is to first react an SiH-functional polysiloxane of the above formula with allyl glycidyl ether, optionally in admixture with $CH_2=CH-CH_2-O(C_2H_4O)_n(C_3H_6O)_mR^7$ in the presence of platinum compounds, such as, for example $H_2PtCl_6 \cdot 6H_2O$; the epoxide which has been introduced, is then reacted with compounds of the general formula:

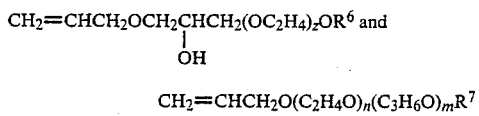

Further details of the synthesis may be found in German Pat. No. 32 15 317 and details concerning the catalysis in German Pat. No. 31 33 869.

In the inventive process, the selected organosilicon compounds should be present in amounts of 0.5 to 10 weight percent, based on the total weight of the formulation. Amounts of 1 to 5 weight percent and especially 1 to 3 weight percent are preferred.

In the following examples, the improved release power of the compounds used in accordance with the present process, relative to that of the products of the state of the art, is shown in greater detail.

For this purpose, a typical RIM formulation is prepared in a hand mixer. The mixture is added to a test mold where it is allowed to react. Internal release agents of the state of the art and release agents according to the present invention are added in otherwise identical trials. In addition, a test foaming is carried out without the addition of release agents.

Experimental Procedure

A polyether polyol (100 parts by weight) with a hydroxyl number of 27, which was synthesized by the addition of propylene oxide to trimethylolpropane and the subsequent addition of ethylene oxide, is mixed with 28 parts by weight of ethylene glycol, 0.35 parts by weight of triethylenediamine, 0.02 parts by weight of tin dibutyl dilaurate and 5 parts by weight of the release agent (hereinafter designated polyol component).

As isocyanate, a product obtained by the reaction of 4,4'-diisocyanato diphenylmethane with tripropylene glycol and having an NCO content of 23% is used (hereinafter designated isocyanate component).

In each case, 100 parts by weight of the polyol component is mixed with 127 parts by weight of the isocyanate component by intensively stirring for 7 seconds with a laboratory stirrer making 2,500 revolutions. The reaction mixture which is still liquid, is poured into a mold which has been heated to 60° C. and can be closed. The mold is closed with a separate lid which is attached with G clamps. Before the reaction composition is poured into the mold, the interior surface of the mold and the inside of the lid used to close the mold, are provided with a wax-containing release agent. For this purpose, the release agent is applied very thinly with a rag and polished. After a molding time of 4 minutes, the lid is removed from the mold and the tension forces required for this purpose are measured with a spring balance. If no internal release agent is used, the lid adheres to the reacted material so that, on forcibly removing of the lid, the surface of the molded article is damaged and parts of the reacted material adhere to the inside of the lid. When an internal release agent is used, the removal of the lid of the mold is facilitated significantly and damage to the surface of the molded article is avoided. The results of comparison experiments are summarized in the table below. The following were employed as organosilicon polymers according to the present invention:

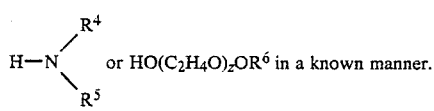

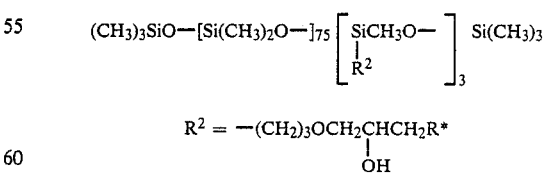

Compound A R* = morpholine radical
Compound B R* = N—monomethylcyclohexylamine radical
Compound C R* = di-(2-methoxyethyl)amine radical
Compound D R* = N—methylpiperazine radical.

The following were used as comparison substances:
Compound E described in U.S. Pat. No. 4,076,695, Example 1

Compound F described in German Offenlegungsschrift No. 25 43 638, top of page 20, Compound G described in U.S. Pat. No. 4,472,341, m=80, q=3, R=CH$_3$, n=2, n'=1, R$^2$=—OCH$_3$.

The amount of release agent added in each case was 1.65 weight percent, based on the reaction formulation.

TABLE

| Product | Release Force (N/100 cm$^2$) |
| --- | --- |
| Blank test without addition of release agent | 40 |
| A ⎫ In accordance | 11 |
| B ⎬ with the | 12 |
| C ⎬ invention | 12 |
| D ⎭ | 11 |
| E ⎫ Not in accordance | 25 |
| F ⎬ with the | 22 |
| G ⎭ invention | 23 |

The measured release force values confirm the high effectiveness of the release agents, which are used in accordance with the present process.

What we claim is:

1. In a process for producing molded polyurethane parts by reacting at least one polyol with an organic di- or polyisocyanate in the presence of catalysts and an internal release agent while molding the product, the improvement which comprises using as the internal release agent 0.5 to 10 weight percent, based on the weight of the reaction mixture, of a compound having the average formula:

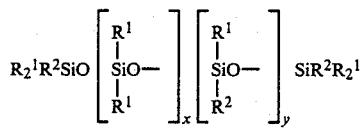

in which
R$^1$ may be the same or different and represents an alkyl radical with 1 to 18 carbon atoms or an aryl radical, at least 70% of the R$^1$ radicals being methyl radicals;
R$^2$ is the same as R$^1$ or represents one of the following radicals,

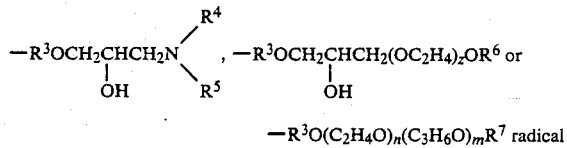

—R$^3$O(C$_2$H$_4$O)$_n$(C$_3$H$_6$O)$_m$R$^7$ radical in which
R$^3$ is a divalent hydrocarbon radical with 2 to 4 carbon atoms,
R$^4$, R$^5$ are univalent hydrocarbon radicals or, taken together are part of a morpholine or a piperazine ring,
R$^6$ is a low molecular weight alkyl radical with 1 to 4 carbon atoms,
R$^7$ is a hydrogen, acyl or R$^6$ radical,
z=1 to 10
n=1 to 20 and
m=1 to 20,
with the proviso that, in the average molecule, at least one R$^2$ radical represents the

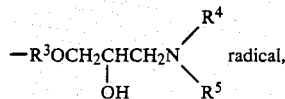

x=20 to 300 and
y=1 to 20.

2. The process of claim 1 wherein R$^1$ is a methyl radical.

3. The process of claim 1 or 2 wherein R$^3$ is a —CH$_2$CH$_2$CH$_2$— radical.

4. The process of claim 1 or 2 wherein R$^4$, R$^5$=an alkyl radical with 1 to 10 carbon atoms, in which the carbon chain may be interrupted by an oxygen atom or together are part of

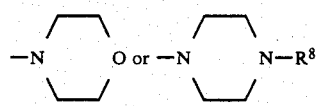

in which R$^8$ is an alkyl radical or an alkyloxyalkyl radical with up to 10 carbon atoms.

5. The process of claim 1 or 2 wherein x is 60 to 200.

6. The process of claim 1 or 2 wherein y is 3 to 10.

7. Process of claim 1 or 2 wherein the reaction mixture contains metal salts of fatty acids with more than 8 carbon atoms or esters of these fatty acids and tri- or multihydric alcohols in amounts of 1 to 5% based on the total weight of the reaction formulation.

8. The process of claim 1 wherein R$^1$ is alkyl having from 1 to 4 carbon atoms.

9. The process of claim 1 wherein the remaining 30 percent of the R$^1$ radicals are selected from the group consisting of ethyl, propyl and butyl.

10. The process of claim 1 wherein up to 10 percent of the R$^1$ radicals contain up to 18 carbon atoms.

11. The process of claim 1 wherein R$^4$ and R$^5$ are selected from the group consisting of methyl, ethyl, propyl, isobutyl, cyclohexyl, and decyl radicals.

12. The process of claim 1 wherein R$^2$ is selected from the group consisting of

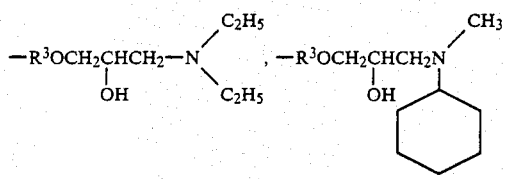

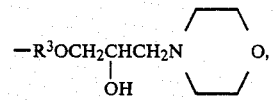

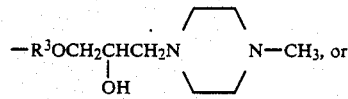

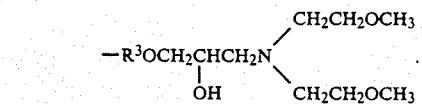

13. A molded polyurethane element produced by the process of claim 1.

* * * * *